United States Patent Office 2,731,347
Patented Jan. 17, 1956

2,731,347

PHOTOGRAPHIC EMULSIONS CONTAINING FLUORINE SUBSTITUTED ETHYLENE POLYMERS AS DELUSTERING AGENTS

Russell H. Gray, Red Bank, N. J., assignor to E. I. du Pont de Nemours and Company, Wilmington, Del., a corporation of Delaware No Drawing. Application October 29, 1951,
Serial No. 253,410

18 Claims. (Cl. 95—7)

This invention relates to photography and more particularly to delustered silver halide photographic emulsions and emulsion layers and to photographic elements bearing the same. The invention also relates to a process of preparing such emulsions.

An object of this invention is to provide improved photographic silver halide emulsions. A further object is to provide photographic silver halide emulsion layers which have a delustered surface. A still further object is to provide a process of making such emulsions and layers which do not have a deleterious effect on the photographic properties of the emulsion. Yet another object is to provide photographic elements with such layers which have enhanced resistance to physical abrasion. Still other objects will be apparent from the following description of the invention.

The above objects are attained and improved photographic silver halide emulsions, emulsion layers and elements, e. g., films, plates, papers, etc., provided by incorporating with the emulsion an aqueous dispersion of a fluorine-substituted ethylene polymer obtained from fluorine-substituted ethylene monomers which contain 3 to 4 fluorine atoms and a hydrogen atom or chlorine atom or a copolymer of such fluorine-substituted monomers with a monoolefine of 2 to 4 carbon atoms or a mono- or di-fluorine-substituted olefine of 2 to 4 carbon atoms wherein the latter component constitutes 2 to 35% by weight of the resulting copolymer.

The polymers may be made from trifluoroethylene, chlorotrifluoroethylene or tetrafluoroethylene or mixtures thereof, or from mixtures of the latter one, two, or all three of such fluoroethylenes with ethylene, propylene, butene-1, butene-2, vinyl fluoride or 1,1-difluoroethylene. The preparation of the polymers including the copolymers is well known in the art and does not constitute a part of this invention. Suitable methods for their preparation are described in the following United States patents:

| | | |
|---|---|---|
| Plunkett | 2,230,654 | Feb. 4, 1941. |
| Joyce | 2,392,389 | Jan. 8, 1946. |
| Brubaker | 2,393,967 | Feb. 5, 1946. |
| Joyce | 2,394,243 | Feb. 5, 1946. |
| Martin | 2,409,948 | Oct. 22, 1946. |
| Coffman et al | 2,419,009 | April 15, 1947. |
| Berry | 2,559,752 | July 10, 1951. |

Aqueous dispersions of the tri- or tetra-fluorine-substituted ethylene polymers can be incorporated with the silver halide emulsions at various stages in their preparation. Thus, they may be added to the aqueous silver halide emulsion or dispersion in a water-soluble or permeable colloid after precipitation of the silver salts and prior to either ripening, washing, digestion or sensitization or they may be admixed with the emulsion or dispersion just prior to coating onto the support, e. g., film, plate or paper.

The aqueous dispersions of the tri- or tetra-fluoroethylene polymers generally consist of colloidal particles of such polymers which have a negative charge and a small amount of a suitable wetting or dispersing agent to increase the stability of the dispersion. The solids content may range from 10% and below to 60% and above. The pH may range from 2–10. It is generally best to use a non-ionic wetting agent or one having the same charge as the polymer, viz., an anionic wetting agent.

The particle size of the polymers in the aqueous dispersion may vary over a fairly wide range, e. g., from 0.05 to 25.0 microns but is generally 0.05 to 0.5 micron. The fact that the small particle sizes deluster the silver halide emulsion layers so efficiently is quite surprising since it has been generally accepted by the art that the particle size should be from 1 to 10 microns.

While aqueous dispersions of the tri- and tetra-fluorine-substituted ethylene polymers are generally admixed with the aqueous colloid-silver halide emulsions to form photographic elements with improved surfaces the invention is not limited to this aspect. To the contrary, the aqueous dispersions may be admixed with an aqueous colloid coating solution, e. g., gelatin, polyvinyl alcohol, etc., and coated onto the colloid silver emulsion layer to form a thin, protective layer.

The invention is further illustrated but is not intended to be limited by the following examples.

Example I

A slow speed contact printing paper gelatin silver chlorobromide emulsion (AgCl=95.2 mole percent, AgBr=4.8 mole percent) was prepared and was brought to optimum speed level preparatory to coating and additions of a sensitizing dye, glycerine, benzotriazole and chrome alum were made. To equal portions of this emulsion were added various quantities of a 50% solids content of an aqueous dispersion of a tetrafluoroethylene polymer wherein 85% of the particles were approximately 0.25 micron in diameter and smaller and containing a small amount of an octyl phenyl polyglycol ether as a dispersing agent. These portions were then coated onto a baryta coated paper stock and dried. Samples of these coatings were then exposed in contact with a standard negative in a contact printer so that prints matched for photographic quality were obtained upon development in a solution of the following composition:

| | Grams |
|---|---|
| N-methyl para-aminophenol sulfate | 1.0 |
| Hydroquinone | 4.0 |
| Sodium sulfite | 15.0 |
| Sodium carbonate | 22.5 |
| Potassium bromide | 0.63 |

Water to make 1.0 liter.

for 1.5 minutes at 68° F. The resulting prints were fixed, washed and dried with the final results as shown:

| Polytetrafluoroethylene Dispersion Ml./Liter Emulsion | Relative Speed | 75° Gloss (or sheen) |
|---|---|---|
| None | 100 | 68 |
| 5.0 | 100 | 50 |
| 20.0 | 96 | 21 |

The gloss or sheen was measured for 75° gloss on a Photovolt Model 660P Gloss Meter manufactured by Photovolt Corporation, 95 Madison Ave., New York, N. Y. This type of gloss meter is described in Chem. Ind. 1943, p. 748.

Example II

A gelatin silver bromochloride emulsion of normal speed for printing paper enlarging (AgBr=76.2 mole percent, AgCl=23.8 mole percent) was prepared and to separate portions there were added varying amounts of an aqueous dispersion of a tetrafluoroethylene polymer similar in particle size of Example I as shown in the following table. The resulting emulsions were coated respectively onto a baryta coated paper base to form a thin layer and dried. Samples of these coatings were then exposed to a standard negative in a diffuse-light enlarger so that prints matched for photographic quality were obtained upon development as specified in Group I. The 75° gloss was measured on the finished and dry prints by means of the instrument specified in Example I.

| Grams polytetrafluoroethylene per 1.5 mole silver halide | ml. polytetrafluoroethylene suspensoid per liter | Relative Speed | 75° Gloss |
| --- | --- | --- | --- |
| None | 0 | 100 | 55 |
| 55.0 | 4.7 | 94 | 40 |
| 110.0 | 9.3 | 82 | 38 |
| 220.0 | 18.6 | 94 | 22 |
| 440.0 | 37.2 | 79 | 14 |

Example III

Gelatino silver halide emulsions were prepared as described in Example I except that the pH of the dispersion had been adjusted to 9–10 with ammonium hydroxide with the following results:

| Grams polytetrafluoroethylene per 1.5 mole silver halide | Relative Speed | 75° Gloss |
| --- | --- | --- |
| None | 100 | 55 |
| 55.0 | 92 | 47 |
| 110.0 | 88 | 34 |
| 220.0 | 82 | 33 |
| 440.0 | 82 | 12 |

Delustering was obtained also by substituting for the dispersing agent of that example a similar amount of sodium dodecyl sulfate.

Example IV

The process described in Example I was repeated by substituting for the polytetrafluoroethylene an aqueous polychlorotrifluoroethylene dispersion having a particle size range of 1–6 microns with the following results:

| Polychlorotrifluoroethylene grams per 1.5 moles silver halide | Relative Speed | 75° Gloss |
| --- | --- | --- |
| None | 100 | 59 |
| 110.0 | 100 | 37 |
| 220.0 | 100 | 30 |
| 440.0 | 100 | 13 |

Example V

The process described in Example I was repeated by substituting for the polymer of that example a copolymeric (equimolar) ethylene/tetrafluoroethylene aqueous dispersion with the results given in the following table:

| Grams copolymer per 1.5 moles silver halide | Realtive Speed | 75° Gloss |
| --- | --- | --- |
| None | 100 | 71 |
| 220.0 | 61 | 58 |

Example VI

A quantity of 5% photographic grade gelatin solution was prepared and to aliquot portions were added varying quantities of an aqueous dispersion of tetrafluoroethylene polymer particles wherein 85% of the particles were approximately 0.25 micron in diameter or smaller and containing a small amount of octylphenyl polyethylene glycol ether which dispersion had a solids content of about 50% by weight. These solutions were then respectively coated on gelatin subbed cellulose acetate film base having a thickness of 0.0055 inch. Upon drying and measurement of the gloss on the instrument described in Example I, the following was observed:

| Polytetrafluoroethylene grams per liter gelatin solution | 75° Gloss |
| --- | --- |
| 0 | 100+ |
| 1.0 | 100+ |
| 2.5 | 59 |
| 5.0 | 60 |

Similar results are obtained by coating the gelatin-polymer dispersion on a gelatino silver halide emulsion layer disposed on the subbed film base.

Example VII

Example VI was duplicated using a 5% aqueous solution of a completely hydrolyzed ethylene/vinyl acetate copolymer of the type disclosed in the examples of McQueen U. S. Patent 2,397,866, April 2, 1946.

| Grams polytetrafluoroethylene per liter PHA solution | 75° Gloss |
| --- | --- |
| 0 | 100+ |
| 5.0 | 68 |

Similar results are obtained by coating the colloid-polymer dispersion onto a polyvinyl acetal color former silver halide emulsion of the type described in Jennings et al. U. S. Patent 2,397,864 dispersed on a film support as described in that patent.

Among the useful dispersing agents which can be used in the aqueous polymer dispersions are octyl phenyl polyglycol ether, sodium decyl sulfate, sodium tetradecyl sulfate, sodium hexadecyl sulfate, sodium octadecyl sulfate, polyoxyethylene sorbitan monolaurate and mixtures of one or more of such compounds. In general, they are used in an amount of 0.5 to 10% by weight of the aqueous dispersion.

The invention is not limited to the particular emulsions of the foregoing examples as other silver halide emulsions can be similarly treated including simple and mixed emulsions of silver chloride, silver bromoiodide, silver chlorobromoiodide, etc. Similarly, it is not limited to the particular colloid binding agents for the silver halide grains and other hydrophilic or water-soluble colloids or mixtures can be substituted. Suitable additional colloids include agar-agar, polyglycuronic acids, zein, collodion, water-soluble cellulose derivatives, such as substantially hydrolyzed cellulose acetate, cellulose esters of hydroxy monocarboxylic acids, e. g., lactic or glycolic acids, alkali metal salts of cellulose esters of dicarboxylic acids, such as phthalic acid; polyvinyl alcohol, partially hydrolyzed polyvinyl acetate and interpolymers thereof with unsaturated materials, such as styrene, maleic acid, etc, water-soluble polyvinyl acetals and other hydrophilic synthetic or natural resins and polymeric compounds. Suitable hydrophilic colloids of the above types are described in United States Patents 2,110,491, 2,276,322, 2,276,323, 2,286,215, and 2,211,323.

It is obvious that the photographic elements may have supports different from those of the foregoing examples. Suitable supports include cellulose derivatives e. g., cellulose nitrate, cellulose triacetate, cellulose propionate, cellulose acetate propionate, cellulose acetate butyrate; superpolymers, e. g., polyvinyl chloride and copolymers thereof with a monoethylenically unsaturated monomer; polystyrene, polyacrylonitrile, polyvinyl fluoride, nylon, polyesters of glycols and dicarboxylic acids, e. g., polyethylene terephthalates; glass, transparentized paper, etc.

During the digestion stage or prior thereto, various types of sensitizing agents, e. g., sulfur sensitizers, such as allylthioureas, thiocyanates, or allylthiocyanates, can be used. In addition, various types of optical sensitizing dyes which modify the spectral characteristics of the resulting emulsions can be added. Suitable sensitizing dyes are described in United States Patents 2,010,388, 2,079,376, 2,202,990, 2,202,991, 2,202,992, 2,278,461, 2,265,908, etc.

In general, the above polymers may be added to the hydrophilic and water-permeable colloid silver halide emulsions over a wide range of proportions. On a solid basis they may vary, for example, from 0.5 to 100.0 grams per liter of emulsion and preferably from 50–500 grams per 1.5 mols of silver halide.

Even though the tri- and tetra-fluoroethylene polymer and copolymer aqueous dispersions have an extremely fine particle size, the surfaces of the colloid layers have excellent delustered characteristics. Moreover, the dried layers show definite protuberances in the range of 1 to 10 microns.

The surfaces of the photographic elements are superior to those obtained with starch and silica particles which are used commercially in a number of respects as outlined below. A decided commercial advantage over the above materials is that the polymer particles do not separate or settle out in the coating solution. Greater uniformity is attained. They do not cause sedimentation in the emulsion.

The use of the tri- and tetra-fluorine-substituted ethylene polymers has the advantage that they provide colloid layers which have good delustered surface characteristics and they can be obtained in a simple manner. The polymers have special advantages in photographic silver halide emulsions and emulsion layers in that they are inert, have excellent heat resistance and do not break down upon hot drying to produce irregular areas of high sheen. They, therefore, are far superior to the conventional starch particles. The emulsion layers have excellent properties for oil coloring and do not increase dye stain.

An important advantage of the invention is that the surface of the photographic elements delustered with the above polymers have a much smoother, more velvety texture to the touch. A still further advantage is that smooth surface papers coated with emulsions containing these resinous delustering particles are matted when air dried yet if the papers are ferro-typed or pressed in intimate contact with a smooth surface during drying, the surface of the dried paper exhibits a sheen as high as one dried similarly yet containing no delusterant.

As many widely different embodiments of this invention can be made without departing from the spirit and scope thereof, it is to be understood that the invention is not to be limited except as defined by the claims.

What is claimed is:

1. A process of delustering water-permeable, organic, protective colloid layers which comprises admixing an aqueous solution of water-permeable, organic, protective colloid with an aqueous dispersion of finely divided particles of an ethylenic addition polymer at least 65% by weight of the polymer units being fluorine-substituted ethylene units containing 3 to 4 fluorine atoms, said particles having sizes within the range of 0.05 to 25.0 microns, and coating the resulting dispersion onto a sheet support.

2. A process of delustering gelatin layers which comprises admixing an aqueous solution of gelatin with an aqueous dispersion of finely divided particles of an ethylenic addition polymer at least 65% by weight of the polymer units being fluorine-substituted ethylene units containing 3 to 4 fluorine atoms, said particles having sizes within the range of 0.05 to 25.0 microns, and coating the resulting dispersion onto a sheet support.

3. A process of delustering water-permeable, organic, protective colloid layers which comprises admixing an aqueous solution of water-permeable, organic, protective colloid with an aqueous dispersion of finely divided particles of polytetrafluoroethylene, said particles having sizes within the range of 0.05 to 25.0 microns, and coating the resulting dispersion onto a sheet support.

4. A process of delustering water-permeable, organic, protective colloid layers which comprises admixing an aqueous solution of water-permeable, organic, protective colloid with an aqueous dispersion of finely divided particles of a tetrafluoroethylene/ethylene copolymer containing at least 65% by weight of the former, said particles having sizes within the range of 0.05 to 25.0 microns, and coating the resulting dispersion onto a sheet support.

5. A process of delustering photographic water-permeable, organic, protective colloid silver halide emulsion layers which comprises admixing an aqueous dispersion of light-sensitive silver halides in a water-permeable, organic protective colloid with an aqueous dispersion of finely divided particles of an ethylenic addition polymer at least 65% by weight of the polymer units being fluorine-substituted ethylene units containing 3 to 4 fluorine atoms, said particles having sizes within the range of 0.05 to 25.0 microns, and coating the resulting dispersion onto a sheet support.

6. A process of delustering photographic gelatino silver halide emulsion layers which comprises admixing an aqueous dispersion of light-sensitive silver halides in gelatin with an aqueous dispersion of finely divided particles of an ethylenic addition polymer at least 65% by weight of the polymer units being fluorine-substituted ethylene units containing 3 to 4 fluorine atoms, said particles having sizes within the range of 0.05 to 25.0 microns, and coating the resulting dispersion onto a sheet support.

7. A process of delustering photographic gelatino silver halide emulsion layers which comprises admixing an aqueous dispersion of light-sensitive silver halides in gelatin with an aqueous dispersion of finely divided particles of polytetrafluoroethylene, said particles having sizes within the range of 0.05 to 25.0 microns, and coating the resulting dispersion onto a sheet support.

8. A light-sensitive, water-permeable organic, protective colloid silver halide emulsion which has uniformly dispersed therethrough as a delustering agent, finely divided particles of an ethylenic addition polymer at least 65% by weight of the polymer units being fluorine-substituted ethylene units containing 3 to 4 fluorine atoms, said particles having sizes within the range of 0.05 to 25.0 microns.

9. A light-sensitive gelatino silver halide emulsion which has uniformly dispersed therethrough as a delustering agent, finely divided particles of an ethylenic addition polymer at least 65% by weight of the polymer units being fluorine-substituted ethylene units containing 3 to 4 fluorine atoms, said particles having sizes within the range of 0.05 to 25.0 microns.

10. A light-sensitive, water-permeable, organic, protective colloid-silver halide emulsion which has uniformly dispersed therethrough as a delustering agent, finely divided particles of polytetrafluoroethylene, said particles having sizes within the range of 0.05 to 25.0 microns.

11. A photographic element comprising a support bearing a light-sensitive, water-permeable, organic, protective colloid-silver halide emulsion layer, the outer water-permeable stratum of said element in contact with the silver halide grains having uniformly dispersed therethrough as a delustering agent, finely divided particles of an ethylenic addition polymer at least 65% by weight of the polymer unit being fluorine-substituted ethylene units containing 3 to 4 fluorine atoms, said particles having sizes within the range of 0.05 to 25.0 microns.

12. A photographic element comprising a support bearing a light-sensitive, gelatino-silver halide emulsion layer, the outer gelatin stratum of said element in contact with the silver halide grains having uniformly dispersed therethrough as a delustering agent, finely divided particles of an ethylenic addition polymer at least 65% by weight of the polymer unit being fluorine-substituted ethylene units containing 3 to 4 fluorine atoms, said particles having sizes within the range of 0.05 to 25.0 microns.

13. A photographic element comprising a baryta coated paper support bearing a light-sensitive, gelatino-silver halide emulsion layer, the outer gelatin stratum of said element in contact with the silver halide grains having uniformly dispersed therethrough as a delustering agent, finely divided particles of an ethylenic addition polymer at least 65% by weight of the polymer unit being fluorine-substituted ethylene units containing 3 to 4 fluorine atoms, said particles having sizes within the range of 0.05 to 25.0 microns.

14. A photographic element comprising a sheet support bearing a light-sensitive, water-permeable, organic, protective colloid-silver halide emulsion layer which has uniformly dispersed therethrough finely divided particles of an ethylenic additon polymer at least 65% by weight of the polymer unit being fluorine-substituted ethylene units containing 3 to 4 fluorine atoms, said particles having sizes within the range from 0.05 to 25.0 microns and being present in an amount of 50 to 500 grams per 1.5 mols of silver halide.

15. A photographic element comprising a baryta coated paper support bearing a light-sensitive, water-permeable, organic, protective colloid-silver halide emulsion layer which has uniformly dispersed therethrough finely divided particles of an ethylenic addition polymer at least 65% by weight of the polymer unit being fluorine-substituted ethylene units containing 3 to 4 fluorine atoms, said particles having sizes within the range from 0.05 to 25.0 microns and being present in an amount of 50 to 500 grams per 1.5 mols of silver halide.

16. A photographic element comprising a sheet support bearing a light-sensitive, gelatino-silver halide emulsion layer which has uniformly dispersed therethrough finely divided particles of an ethylenic addition polymer at least 65% by weight of the polymer unit being fluorine substituted ethylene units containing 3 to 4 fluorine atoms, said particles having sizes within the range from 0.05 to 25.0 microns and being present in an amount of 50 to 500 grams per 1.5 mols of silver halide.

17. A photographic element comprising a sheet support bearing a light-sensitive, water-permeable, organic, protective colloid-silver halide emulsion which has uniformly dispersed therethrough finely divided particles of a polytetrafluoroethylene, said particles having sizes within the range from 0.05 to 25.0 microns and being present in an amount of 50 to 500 grams per 1.5 mols of silver halide.

18. A photographic element comprising a baryta coated paper bearing a light-sensitive, water-permeable organic protective colloid-silver halide emulsion which has uniformly dispersed therethrough finely divided particles of a polytetrafluoroethylene, said particles having sizes within the range from 0.05 to 25.0 microns and being present in an amount of 50 to 500 grams per 1.5 mols of silver halide.

References Cited in the file of this patent

UNITED STATES PATENTS

| | | |
|---|---|---|
| 2,221,873 | Knoefel | Nov. 19, 1940 |
| 2,313,144 | Gomm | Mar. 9, 1943 |
| 2,456,255 | Coffman et al. | Dec. 14, 1948 |
| 2,478,229 | Berry | Aug. 9, 1949 |
| 2,496,978 | Berry | Feb. 7, 1950 |
| 2,499,097 | Houk et al. | Feb. 28, 1950 |
| 2,531,134 | Kropa et al. | Nov. 21, 1950 |
| 2,534,326 | Weaver | Dec. 19, 1950 |
| 2,559,752 | Berry | July 10, 1951 |
| 2,635,093 | Miller | Apr. 14, 1953 |

FOREIGN PATENTS

| | | |
|---|---|---|
| 511,691 | Great Britain | Aug. 23, 1939 |